F. I. JOHNSON.
RESILIENT TIRE.
APPLICATION FILED APR. 25, 1918.
1,287,036.
Patented Dec. 10, 1918.
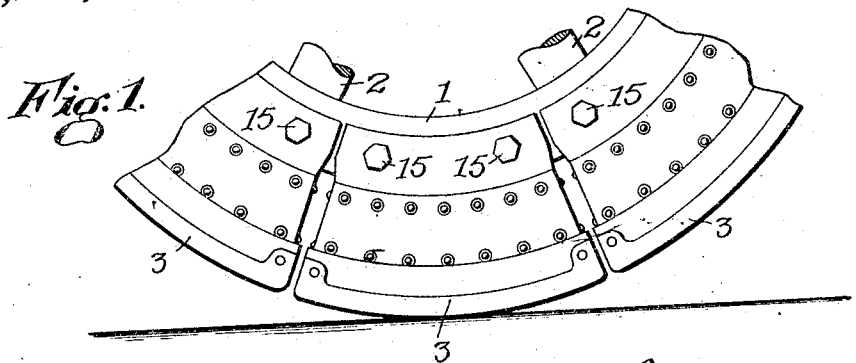
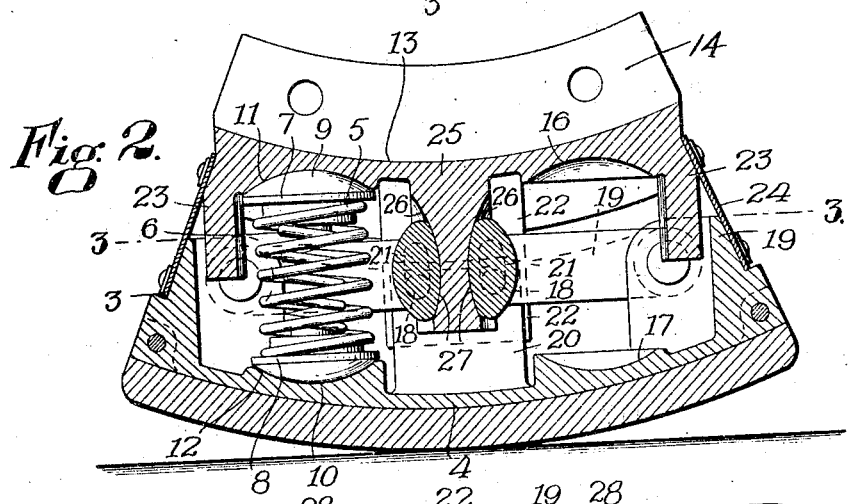
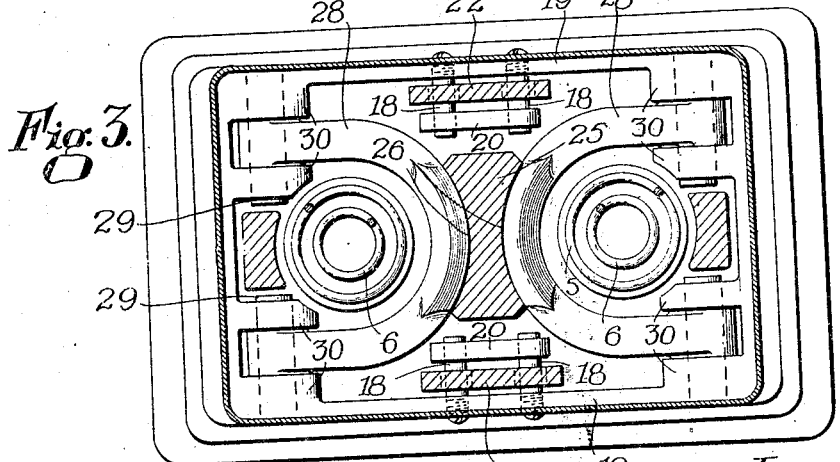
Inventor
F. I. Johnson
By Attorney
Geo. W. Kennedy Jr.

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

RESILIENT TIRE.

1,287,036.  
Specification of Letters Patent.  
Patented Dec. 10, 1918.

Application filed April 25, 1918. Serial No. 230,708.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Resilient Tires, of which the following is a specification accompanied by drawings forming a part of the same.

My invention relates to tires adapted to that class of wheels which are used to support heavy loads and in which a degree of resilience is desirable. My improved tire is especially adapted for use in motor trucks or other motor vehicles which require unusual strength and are capable of yielding to inequalities of the road, whereby the vehicle itself is relieved from injurious strains.

The object of my invention is to provide a tire of the above described character and avoid the use of pneumatic tires which possess many disadvantages, and I attain this object by means of a series of tire sections arranged concentrically around the rim of the wheel with interposed springs between the rim of the wheel and the tire sections, with means whereby the rotative movement of the rim, in the case of motor driven wheels, will be communicated to the tire sections, or, in the case of other wheels, the rotative movement of the tire sections may be communicated to the rim of the wheel. I accomplish these results by means of the construction and arrangement of parts as hereinafter described and illustrated in the accompanying drawings, in which Figure 1 represents a side view of a portion of a wheel embodying my invention.

Fig. 2 is a central sectional view on a plane at right angles to the axis of the wheel, and Fig. 3 is a sectional view on the plane of the broken line 3—3, Fig. 2.

Similar reference characters refer to similar parts in the different figures.

Referring to the accompanying drawings 1 denotes a portion of the rigid rim of a vehicle wheel mounted in the usual manner upon spokes 2, 2. Mounted upon the rim 1 is a resilient tire embodying my present invention, formed in separate sections 3. The separated sections 3 are duplicates of each other and a description of one will therefore suffice, reference being had to Figs. 2 and 3 which represent one of said sections in sectional view and upon a larger scale.

The section 3 comprises a tread plate 4 concentric with the rim of the wheel and separated therefrom by coiled springs arranged in pairs 5 and 6 of different diameters to allow one to be placed within the other, the inner spring 6 being held concentrically with the outer spring 5 by means of heads 7 and 8. The heads 7 and 8 have their outer surfaces 9 and 10 convex, fitting concave recesses 11 and 12. The concave recess 11 is formed in the present instance in a rim plate 13 having flanges 14, which inclose the sides of the rim 1 and are attached thereto by bolts 15, 15. One pair of springs only is shown in Fig. 2, but a similar pair with similar convex heads is placed near the opposite end of the tire section and is held in the concave recesses 16 and 17, said second pair of springs being shown in plan view in Fig. 3. The tread plate 4 is therefore subjected to the expansion of the two pairs of springs on opposite sides of its center, tending to force it away from the rim of the wheel. The outer movement of the tread plate 4 is limited by the studs 18, two upon each side, held by their screwthreaded outer ends in a flange 19 of the tread plate 4, and at their inner ends by a lug 20 integral with the tread plate and extending therefrom toward the center of the wheel. The studs 18 pass through slots 21 in the lugs 22, in the present instance integral with the rim plate 13, and extending outwardly and overlapping the lugs 20. The slots 21 allow a movement of the tread plate 4 toward the center of the wheel as the springs 5 and 6 are compressed by the weight of the load. The rim plate 13 is provided with a flange 23 extending outwardly from the rim plate, said flange having outward extensions at each end, as shown in Fig. 3, which oppose the flange 19 on the tread plate; and at the outer side of the flanges 19 and 23 I attach a flexible band 24 of leather or some suitable material covering the open space between the flanges, and preventing the admission of dirt to the interior of the resilient section 3.

The rotative movement of the wheel is imparted to the tread plate 4 when the wheel is motor driven, and from the tread plate 4 to the wheel when the latter is being drawn over the ground, by means of a central lug 25 extending outwardly from the rim plate 13 and provided on its opposite sides with concave faces 26, 26. Fitting the concave faces 26 are the convex faces 27 of the curved bails 28, 28, pivoted on studs 29 held in lugs 30 projecting from the inner side of the tread plate 4.

By the above construction the tread plate 4 is free to move at either end toward the center of the wheel as the load is supported, and at the same time the rotative movement of the wheel will be imparted to the tread plate through the lug 25 and the pivoted bails 28.

I claim,

1. A resilient tire comprising a rim plate, a tread plate arranged concentrically to said rim plate, interposed springs on opposite sides of the transverse center of said tread plate, means for limiting the outward movement of the tread plate, and means for imparting the rotative movement of the wheel to the tread plate consisting of a central lug extending outwardly from the rim plate and provided with concave sides, and swinging members pivotally held by the tread plate and having their free ends engaging the concave sides of said central lug.

2. A resilient tire comprising a rim, a plurality of outer sections concentric with said rim and having a series of compression springs arranged to sustain the load, radially projecting lugs rigid with said rim and provided with concave recesses on their advancing sides as the wheel is rotated in either direction, and a pair of members pivoted in each of said outer sections concentrically with the curvature of said concave recesses, and having their free ends seated in said recesses.

3. A resilient tire comprising a rim, radially spaced lugs rigid with said rim and provided with concave recesses on their advancing sides as the wheel is rotated in either direction, a series of spaced tread plates concentric with said rim, and a pair of curved bails pivotally attached to each tread plate, each bail having its free end seated in a concave recess of one of said lugs.

4. A resilient tire comprising a rim plate, a lug projecting radially therefrom having curved recesses in its opposite sides and in the plane of the wheel, a tread plate normally concentric with the rim plate, a pair of bails pivoted at their ends at the corners of said tread plate, and having their curved sections fitting the concave recesses of said lug.

5. A resilient tire comprising a rim plate, a lug projecting radially therefrom having concave recesses in its opposite sides and in the plane of the wheel, a tread plate normally concentric with the rim plate, springs interposed between the tread plate and the rim plate, means for limiting the outward movement of the tread plate and pivoted members carried by the tread plate and fitting the concave recesses of the radially projecting lug.

6. In a resilient tire of the class described, a rim plate, a tread plate normally held concentric with said rim plate, interposed springs between the rim plate and the tread plate, means for limiting the outward movement of the tread plate under the tension of said springs, pivoted members carried by said tread plate and a lug projecting outwardly from the rim plate between said pivoted members and contacting with each of said pivoted members.

Dated this twenty-second day of April, 1918.

FREDERIC I. JOHNSON.

Witnesses:
 MINNIE BRITTON STODDARD,
 GEO. H. KENNEDY, Jr.

Copies of this patent may be obtained for five cents each, by addressing the "Commissioner of Patents, Washington, D. C."